United States Patent
Council et al.

(10) Patent No.: US 6,365,536 B1
(45) Date of Patent: Apr. 2, 2002

(54) METHOD OF MAKING BLEACHING CLAY

(75) Inventors: Steven T. Council, Downers Grove; Marc A. Herpfer, Grayslake; Dov Shaked, Buffalo Grove, all of IL (US)

(73) Assignee: Oil-Dri Corporation of America, Chicago, IL (US)

( * ) Notice: Subject to any disclaimer, the term of this patent is extended or adjusted under 35 U.S.C. 154(b) by 0 days.

(21) Appl. No.: 09/566,111

(22) Filed: May 5, 2000

(51) Int. Cl.[7] .......................... B01J 21/16; B01J 37/00
(52) U.S. Cl. ..................... 502/81; 502/80; 502/83
(58) Field of Search ..................... 502/80, 81, 83, 502/85; 426/253; 554/191

(56) References Cited

U.S. PATENT DOCUMENTS

| | | | |
|---|---|---|---|
| 2,941,959 A | * | 6/1960 | Greene et al. |
| 4,919,818 A | * | 4/1990 | Alexander |
| 5,008,226 A | * | 4/1991 | Taylor et al. |
| 5,749,955 A | * | 5/1998 | Shaked et al. |
| 5,783,511 A | * | 7/1998 | Banin et al. |
| 5,906,500 A | * | 6/1999 | Brooks et al. |
| 5,917,069 A | * | 6/1999 | Buckl et al. |
| 6,130,179 A | * | 10/2000 | Sampson et al. |

FOREIGN PATENT DOCUMENTS

| | | | |
|---|---|---|---|
| WO | WO 99/02256 | * | 1/1999 |

* cited by examiner

Primary Examiner—Steven P. Griffin
Assistant Examiner—Christina Ildebrando
(74) Attorney, Agent, or Firm—Olson & Hierl, Ltd.

(57) ABSTRACT

A bleaching clay having an enhanced bleaching performance in oils is produced by first beneficiating a raw clay to remove sand and thereafter conditioning and then concentrating the beneficiated clay with a pH modifier and a Lewis acid salt.

31 Claims, 3 Drawing Sheets

METHOD OF MAKING BLEACHING CLAY

TECHNICAL FIELD

This invention relates to a method of making a bleaching clay effective for the removal of color impurities found in mineral, vegetable, and animal oils.

BACKGROUND OF THE INVENTION

Acid treated clays are routinely used for adsorptive purification of petroleum products and oils (both edible and nonedible) derived from vegetable or animal sources. With the traditional focus having been on the decolorizing effect, clay and clay-like materials used for oil purification are commonly called bleaching clays. Targeted color impurities typically present in oils include, for example, carotenoids, xanthophylls, xanthophyll esters, chlorophyll, tocopherols, as well as oxidized fatty acids and fatty acid polymers.

A historical method of removing colored impurities from oils involved intimately contacting the oil with "Fuller's earth," an imprecise label applied to mixtures of clay minerals having oil-bleaching properties, but thought to contain mostly palygorskite, sepiolite, and smectite. See A.D. Rich, "Bleaching Clay," Industrial Minerals & Rocks, 3rd Ed., AIMMPE, N.Y., pp. 93–101 (1960). In the early 1900s, it was discovered that the ability of Fuller's earth and related clay minerals to adsorb or otherwise eliminate color impurities from oil is improved by acid activation. Accordingly, acid-activated clays are more widely used for bleaching purposes.

In effect, conventional acid treatment of clay replaces exchangeable cations, such as $K^+$, $Na^+$, and $Ca^{2+}$, by $H^+$ in the intralamellar space of the clay's crystalline lattice and also leaches out some of the $Al^{3+}$, $Fe^{3+}$, and $Mg^{2+}$ metal cations. Acid treatment thus renders the clay physically more porous and electrochemically more active.

The general process of acid-activation of clays, as used today in industry, includes grinding clay for uniform activation and dispersion in water, slurrying the ground clay in water and then adding acid to the clay slurry. Usually about 6 to 8 hours of acid digestion is necessary to properly acid-activate the clay. The digested slurry then is washed substantially free of dissolved salts, such as iron and aluminum sulfates or chlorides, depending upon the particular mineral acid used. The acid-activated clay then is dewatered, such as by filtration, and the resulting filter cake is dried and subsequently ground to product specifications.

The following patents describe various processes for treatment of clay to enhance the filtering characteristics of the clay in the removal of colorizing compounds: U.S. Pat. No. 1,402,112 to Tellier; U.S. Pat. No. 1,408,656 to Stratford; U.S. Pat. No. 1,408,655 to Stratford; U.S. Pat. No. 1,524,843 to Ruprecht; U.S. Pat. No. 1,544,210 to Bierce; U.S. Pat. No. 1,731,702 to Black; U.S. Pat. No. 1,739,734 to Raine et al.; U.S. Pat. No. 3,029,783 to Sawyer et al.; U.S. Pat. No. 3,617,215 to Sugahara; U.S. Pat. Nos. 4,717,699; 4,847,266; and 4,919,818 to Alexander.

U.S. Pat. No. 3,617,215 to Massaire et al., for example, describes a process for the production of acid-activated bleaching clay that entails mixing an aqueous clay slurry with a high dose of concentrated acid at elevated temperatures (100° C. to 121° C.), followed by washing and drying of the acidulated product. This prior art method results in high levels of residual acid effluent and salts thereof whose removal and disposal costs are expensive, however. Other commercial manufacturing process for the production of bleaching clay avoids the use of large amounts of concentrated acid but requires a high-temperature (about 1000° F.), and therefore high-cost, calcining step to calcine the raw clay (e.g. U.S. Pat. No. 3,029,783 to Sawyer et al.).

The raw clay starting materials used to produce bleaching clays contain varying types of sand, which may include quartz, feldspar, mica and other relatively hard minerals. Because they foul oil processing equipment and offer at most negligible bleaching action, these sand constituents are, in effect, inert bleaching clay contaminants.

The present invention concerns an improved method of producing activated bleaching clay having a reduced amount of inert constituents.

SUMMARY OF THE INVENTION

A bleaching clay manufacturing method according to the present invention provides improved acid activation of the clay mineral without substantial deterioration of the clay mineral structure. The bleaching clay product is prepared by slurrying particulate palygorskite clay starting material with water to form an aqueous slurry, removing sand from the aqueous slurry to form a beneficiated slurry, conditioning the beneficiated slurry by combining therewith a conditioning agent such as a pH modifier, a Lewis acid salt, and mixtures thereof, separating the conditioned slurry into an acidic filtrate and a conditioned clay concentrate, and drying the conditioned clay to a free flowing particulate mass, usually having a free moisture content of about 5 to 25 percent by weight, preferably 10 to 20 percent by weight.

A preferred palygorskite clay starting material is a particulate naturally occurring palygorskite—smectite clay mineral having a pH value in the range of about 5 to about 9, preferably about 7 to about 9. The slurrying step is conducted such that the aqueous slurry has a clay solids content in the range of about 5 to about 30 weight percent, based on the total weight of the slurry. At a solids content above about 20 percent by weight a dispersant can be added, if desired, to enhance flow properties. In the slurry conditioning step, the beneficiated slurry is combined with a Lewis acid salt in an amount in the range of about 0.25 to about 3 weight percent (based on the weight of the solids) and/or a sufficient amount of a pH modifier to adjust the pH of the slurry to a value in the range of about 0.5 to about 6. The solid/liquid separation step is conducted such that the conditioned clay concentrate has a solids content of 15 up to 50 weight percent, preferably 40 to 50 weight percent, based on the total weight of the concentrate.

The resulting bleaching clay may be utilized for bleaching purposes in numerous applications for a wide variety of edible oils and the like.

DETAILED DESCRIPTION OF PREFERRED EMBODIMENTS

While this invention is susceptible to embodiment in many different forms, this specification and the accompanying drawings disclose only preferred forms as examples of the invention. The invention is not intended to be limited to the embodiments so described, however. The scope of the invention is identified in the appended claims.

Preferred starting materials for the present method are the natural palygorskite clay minerals and the synthetic layered silicates that already exhibit some bleaching activity. The term "palygorskite clay" refers to a naturally occurring material composed primarily of fine-grained attapulgite minerals, which material can contain also smectite and is generally plastic at appropriate water contents and will harden when dried or fired. Although such clay usually contains phyllosilicates, it also may contain other materials that impart plasticity and harden when dried or fired. Associated phases in clay may include materials that do not impart plasticity and organic matter. The term "clay mineral" refers to phyllosilicate minerals and to minerals which impart plasticity and which harden upon drying or firing. See generally, Guggenheim, S. & Martin, R. T., "Definition of Clay and Clay Mineral: Joint Report of the AIPEA Nomenclature and CMS Nomenclature Committees," *Clays and Clay Minerals* 43: 255–256 (1995).

Clay minerals are characterized by a mineral structure formed by the arrangement of octahedral units and tetrahedral units or by stacked layers formed by an octahedral sheet and one or more tetrahedral sheets of the atoms that constitute the clay mineral structure. Illustrative are the two groups of naturally occurring clay minerals.

First is the hormite group, defined here as including palygorskite and sepiolite, which have channels formed by octahedral units and tetrahedral units of the clay mineral structure.

Palygorskite (attapulgite), a mineral found in some clay deposits, is a hydrous silicate mineral represented by the ideal formula:

$(OH_2)_4(OH)_2Mg_5Si_8O_{20}\cdot 4H_2O$.

See, e.g., Grim, R. E., *Clay Mineralogy*, 2nd ed., McGraw-Hill, Inc., New York, N.Y. (1968), p. 115. Other members of the hormite group of minerals, such as sepiolite, can be associated with palygorskite.

Second is the smectite group including montmorillonites and saponite, which are constituted by stacked layers formed by an octahedral sheet and more than one tetrahedral sheet, and mixtures of the foregoing. Smectite is a generic term that refers to a variety of related minerals also found in some clay deposits. The smectite minerals typically occur only as extremely small particles. Smectite is composed of units made of two silica tetrahedral sheets with a central alumina octahedral sheet. Each of the tetrahedra has a tip that points to the center of the smectite unit. The tetrahedral and octahedral sheets are combined so that the tips of the tetrahedra of each silica sheet and one of the hydroxyl layers of the octahedral sheet form a common layer. See Id., pp. 77–78. Some types of smectite minerals, e.g., Na-montmorillonite, exhibit intracrystalline swelling.

In particular, the smectite family of clay minerals includes the various mineral species montmorillonite, beidellite, nontronite, hectorite and saponite, all of which can be present in the clay mineral in varying amounts.

As noted above, other minerals, neither of the smectite genus nor of the hormite variety, are typically present in varying amounts in mined clay. These include opal, apatite, calcite, quartz, the feldspars, mica, amorphous silica (diatoms), kaolinite, pyrite and gypsum, among others. Of the enumerated minor constituents, the broad "sand" label is conventionally applied to the quartz, feldspars, mica, and other relatively hard minerals.

A palygorskite-smectite variety of clay having a slurry pH value of about 5 to about 9 is the generally preferred for the present method of preparing bleaching clay. The pH value of the clay is determined from a 5-weight percent slurry of the clay in distilled water. The slurry is agitated for fifteen minutes prior to measurement of the pH value by a conventional pH meter.

Figure 1:
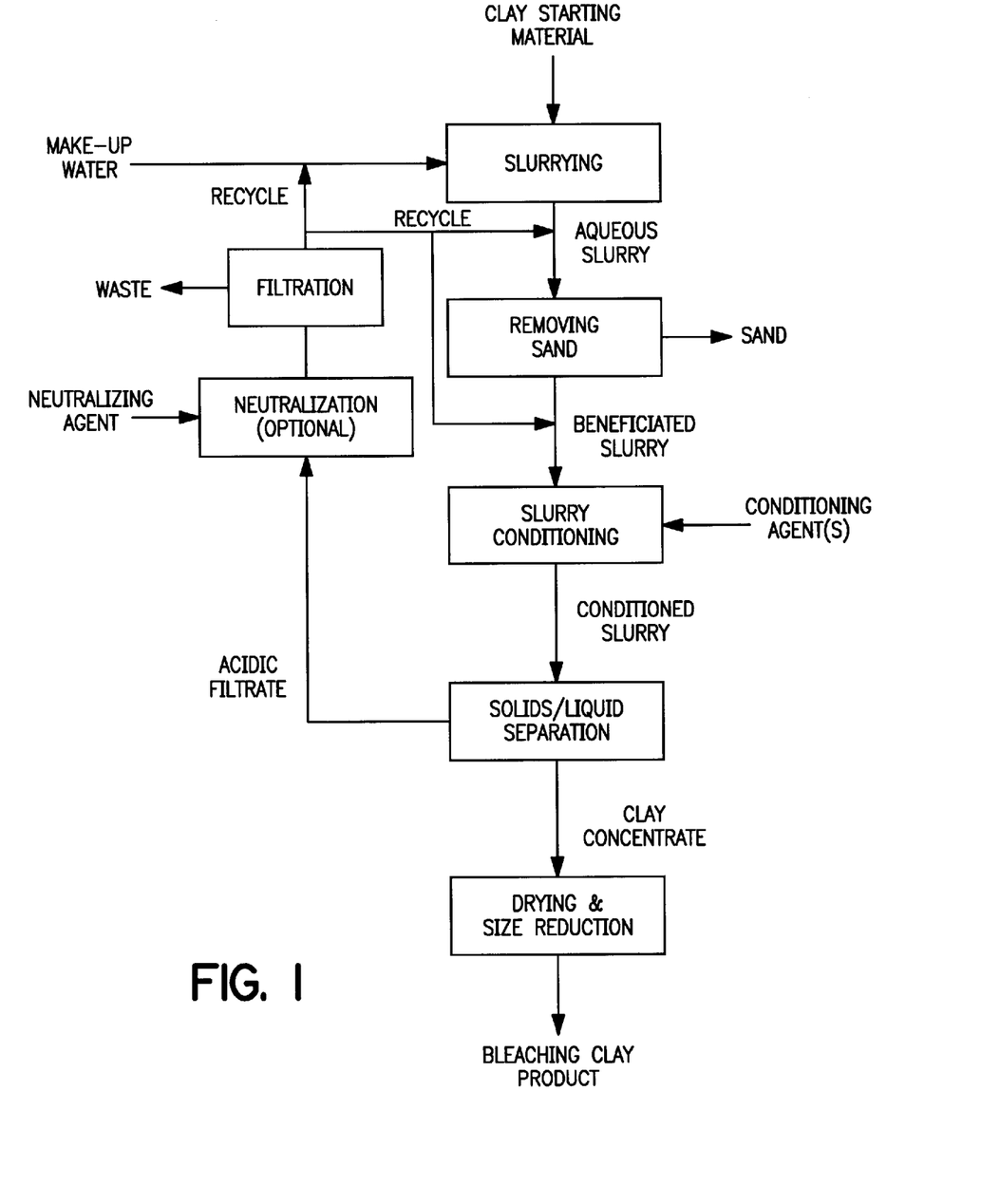
FIG. 1 is a simplified flow diagram in block format of a process for making bleaching clay according to the present invention. Within FIG. 1, a single block may indicate several individual steps and/or process units which collectively perform a desired function.
Figure 2:
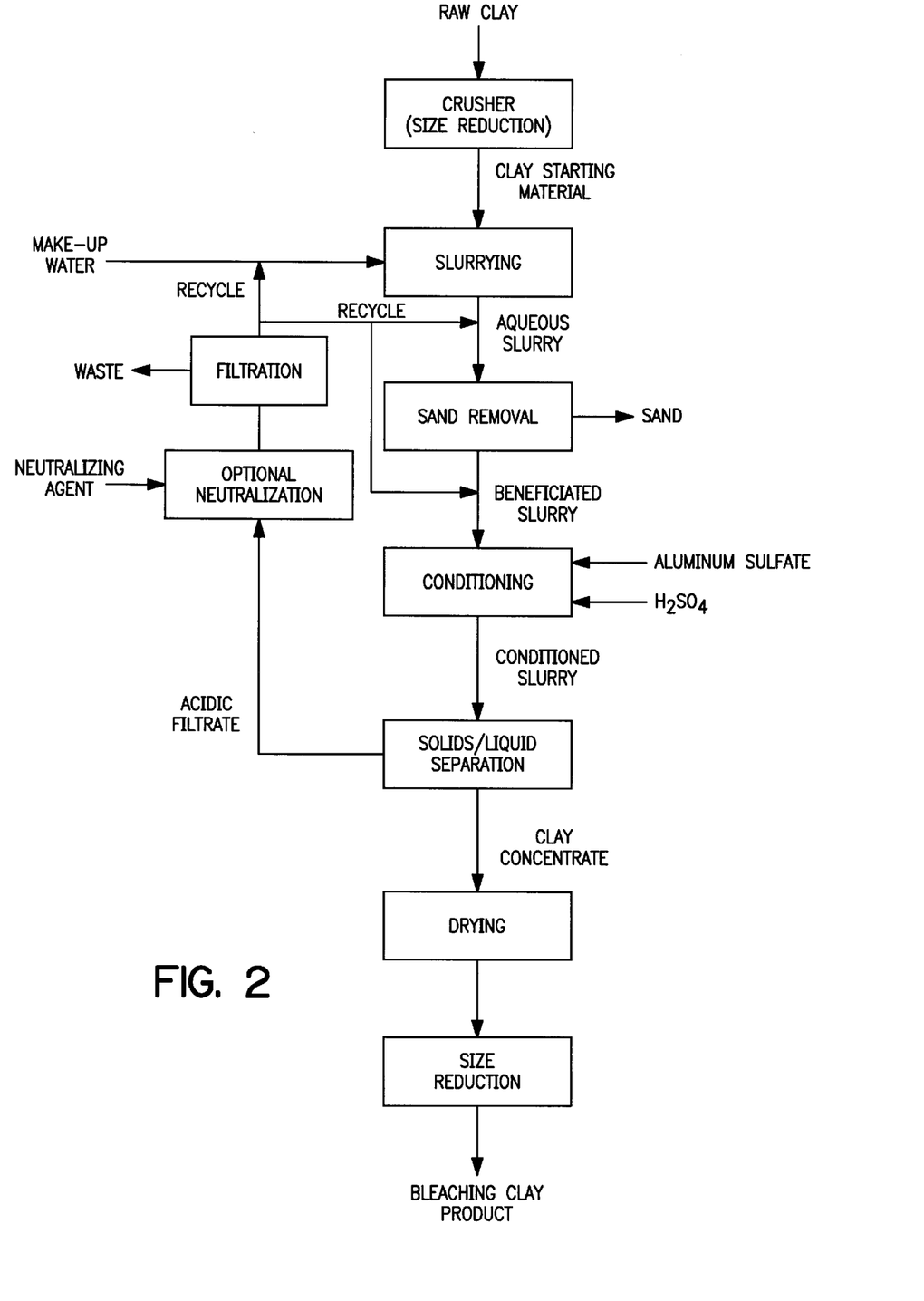
FIG. 2 is another simplified flow diagram of a process for making bleaching clay according to the present invention.

FIG. 1 illustrates a bleaching clay manufacturing process according to the present invention in block diagram format. FIG. 2 is a like-formatted diagram that indicates another suitable process scheme.

With general reference to FIGS. 1 and 2, raw clay starting material is slurried with water (recycled and make-up) such that the resulting aqueous slurry has a clay solids content in the range of about 5 to about 30 weight percent, based on the total weight of the slurry and the dry weight of clay. In the slurrying, water and clay are mixed with aggressive agitation (i.e. high shear blunging, dispersation, or disaggregation). Blunging may be carried out in a suitable mixer or series of mixers.

Raw mined clay usually has a free moisture content in the range of about 40 to about 55 percent. The raw mined clay may be crushed to a preferred particulate size prior to slurrying, usually less than one-half inch (about 13 mm) in effective diameter. A multi-stage size reduction is preferred because a complete crushing of raw clay also comminutes sand-like components, rendering these contaminants more difficult to remove from the clay.

To enhance the rheological properties of the aqueous clay slurry, the slurrying step optionally can include the use of a dispersant such as sodium metasilicate, tetrasodium pyrophosphate, sodium tripolyphosphate, or disodium pyrophosphate, or sodium hexametaphosphate in an amount up to about 1 percent by weight, based on dry clay. Alternative dispersants suitable for present purposes are potassium oxalate or Na-polyacrylate (if clay is calcined at 200–400° C.

Sand and sand-like particles are next removed from the aqueous slurry. A variety of processing methods and corresponding equipment are available for the sand removal step including centrifuges, wet-screens, flotation cells and cone classifiers. For a discussion of wet classification methods and equipment, see *Perry's Chemical Engineering Handbook,* 7th Ed., McGraw-Hill, Inc., New York, N.Y. (1997), pp. 19–23 to 19–30. A wet cyclone classifier is presently favored.

Wet cyclone classifiers, also called hydrocyclones, have a top cylindrical section and a lower conical section terminating in an adjustable apex opening. According to the present invention, the aqueous clay slurry is pumped into the cylindrical portion of the hydrocyclone tangentially, thus producing centrifuging action and vortexing. The hydrocyclone cover has a downward-extending pipe called a vortex finder, which cuts the vortex and removes the overflowing clay slurry. The sand and sand-like particles travel down the sides of the steeply sided cone section and are removed at the apex in a partially dewatered form.

For higher yields or enhanced sand removal, the sand removal step may be multistage fractionation. For example, the mostly sand underflow from a first stage hydrocyclone may be reslurried and directed to a second suitable sized hydrocyclone downstream. The clay slurry overflows from the first and second stages are then combined for further processing.

The beneficiated clay slurry resulting from the sand removal step next undergoes a conditioning step, in which the slurry is admixed with a Lewis acid salt and a pH modifier. The total solids content of the clay slurry during conditioning is an important aspect of the present invention. The total solids content of the clay slurry during conditioning is maintained in the range of about 5 to about 30 weight percent, and preferably in the range of about 5 to about 15 percent, based on the total weight of the slurry. Conditioning is carried out at a temperature in the range of about ambient to about 80° C., preferably ambient to about 60° C.

Because the total solids content of the beneficiated aqueous clay slurry resulting from the sand removal step necessarily varies according to the choice of separation methods and the solids content of the feed slurry, adjustments through make-up water or de-watering may be required to move the total solids content of the beneficiated slurry into the desired range. When, for example, a single hydrocyclone is employed for sand removal, the total solids content of the feed slurry is preferably in the range of about 15 to about 17 weight percent. Within this range of total solids for the input slurry, the hydrocyclone typically yields a beneficiated slurry overflow having a solids content in the range of about 10 to about 15 weight percent.

The conditioning agent can be a pH modifier, a Lewis acid salt, or mixtures thereof.

The Lewis acid salt is added to the beneficiated slurry in an amount in the range of about 0.5 to about 3 weight percent (based on the dry zero moisture weight of the clay in slurry). While aluminum sulfate ($Al_2(SO_4)_3$) is the presently favored Lewis acid salt for this treatment, various other Lewis acids, including ferrous sulfate, zinc sulfate and titanium sulfate, are also acceptable. The bleaching activity ability of clay is enhanced by introducing cations of high charge and relatively small radius, such as $Al^{3+}$, $Fe^{2+}$, $Fe^{3+}$, $Zn^{2+}$ or $Ti^{4+}$ that react with water to make a proton available for further reaction.

The charge and the radius of the cation relates to the ionic potential of an ion. Mason, B., *Principles of Geochemistry* 2d, p. 155, Wiley and Sons, New York (1958). Ionic potential is the charge of the ion (Z) divided by the radius of the ion (r), and is, in effect, a measure of electronegativity. Id., 155–56. Ionic potentials of several ions are given in Table 1. Cations having ionic potentials in the range of about 2.5 to about 10 are preferred and are provided by the preferred Lewis acid salts of the present invention, i.e., aluminum salts such as aluminum chloride, aluminum sulfate, and the like, iron salts such as ferric sulfate, ferrous sulfate, and the like, zinc sulfate, and the like, as well as titanium salts such as titanium sulfate and the like.

TABLE 1

Ionic Potentials

| | | | |
|---|---|---|---|
| $Cs^+$ | 0.60 | $Th^{4+}$ | 3.9 |
| $Rb^+$ | 0.68 | $Ce^{4+}$ | 4.3 |
| $K^+$ | 0.75 | $Fe^{3+}$ | 4.7 |
| $Na^+$ | 1.0 | $Zr^{4+}$ | 5.1 |
| $Li^+$ | 1.5 | $Be^{2+}$ | 5.7 |
| $Ba^{2+}$ | 1.5 | $Al^{3+}$ | 5.9 |
| $Sr^{2+}$ | 1.8 | $Ti^{4+}$ | 5.9 |
| $Ca^{2+}$ | 2.0 | $Mn^{4+}$ | 6.7 |
| $Mn^{2+}$ | 2.5 | $Nb^{5+}$ | 7.5 |
| $La^{3+}$ | 2.6 | $Si^{4+}$ | 9.5 |
| $Fe^{2+}$ | 2.7 | $Mo^{5+}$ | 9.7 |
| $Zn^{2+}$ | 2.7 | $B^{3+}$ | 13 |
| $Co^{2+}$ | 2.8 | $P^{5+}$ | 14 |
| $Mg^{2+}$ | 3.0 | $S^{5+}$ | 20 |
| $Y^{3+}$ | 3.3 | $C^{4+}$ | 25 |
| $Lu^{3+}$ | 3.5 | $N^{5+}$ | 38 |
| $Sc^{3+}$ | 3.7 | | |

The pH modifier is preferably an inorganic acid (or mixture thereof) such as, for example phosphoric acid, $H_2SO_4$ and HCl, but may also include organic acids such as acetic acid, oxalic acid, and citric acid. A sufficient amount of pH modifier is added to adjust the pH value of the beneficiated slurry in the range of about 0.5 to about 6, and preferably in the range of about 1 to about 3.

The amount of pH modifier required to effect the desired pH adjustment varies according to the pH value of the preconditioned clay, the pH modifier selected, the total solids concentration of the beneficiated slurry to be conditioned, the solids content of conditioned concentrate, and desired product pH target. Optimal acidification is a function of the degree of solid/liquid separation of the conditioned slurry. When a preferred clay starting material is utilized, which has a pH value in the range of about 5 to about 9, within the preferred total solids concentration for the beneficiated slurry, sufficient pH modifier is added in the conditioning step to create a slurry having an acid equivalent concentration in the range of about 0.01 to about 1 Normal (N), based on the total volume of the slurry. If the clay starting material is selected to have a pH value in the range of about 7 to about 9, sufficient acid is admixed to the beneficiated slurry to achieve an acid concentration in the preferred range of about 0.1 to about 0.4 Normal (N). If the clay starting material has a generally lower pH (about 5 to about 7), sufficient acid is admixed with the beneficiated slurry to achieve an acid concentration in the range of about 0.01 to about 0.3 Normal (N).

The clay conditioning step may include a relatively limited temperature elevation as well as agitation. Any temperature elevation by heating is limited such that the slurry does not reach a clay-damaging boiling point. Accordingly, the slurry temperature during the conditioning step is preferably maintained in the range of about ambient to about 60° C. For a batch mode operation, agitation can be readily achieved by the use of a static mixer, a commercially available blender, or the like expedient.

The contact time for clay with conditioning agents may vary, but for efficient operation should not be less than 15 minutes. The average agitation time is preferably in the range of about 15 minutes to about 1 hour during the conditioning step.

Following the conditioning step, the conditioned slurry is separated into an acidic filtrate and a conditioned clay concentrate utilizing either centrifugation, vacuum or pressure filtration or membrane filtration. In accordance with a preferred embodiment, the separation is achieved in a high-pressure filter press. Suitable high-pressure filter presses are commercially available capable of generating up to 250 psi of pressure. For example, conditioned slurry is pumped to a chamber-type filter press having open drainage to extract the acidic filtrate (or mother liquor) while filing the filter press chambers with the conditioned clay. The flow rate of the acidic filtrate, which decreases when the chambers of the filter press are filled, may serve as a signal to stop the flow of conditioned slurry into the filter press. Subsequently, a high-pressure "squeeze" is applied to the chambers to further increase the clay concentrate to 40–50 weight percent solids content.

The clay cake in the filter press chambers may be washed with water introduced at elevated pressure (e.g. 20 to 150 psi). Washing the conditioned clay removes excess acid, dissolved iron, aluminum, magnesium, and calcium ions and other clay contaminates. The end of the optional washing step may be determined by monitoring the pH of the filtrate exiting the filter press.

The resulting conditioned clay concentrate or mass may have a thick gel, paste-like, or a brittle cake-like consistency as desired, provided the solids content of the resulting clay mass is at least about 15 percent by weight, and can be up to about 50 percent by weight. The conditioned clay is dried via conventional process equipment suitable for particulate material such as a rotary, flash, fluid-bed or spray drier to a moisture content of no more than about 25 percent, based on the weight of the clay. In one embodiment of the present invention, the conditioned clay concentrate is dried at a material temperature in the range of about 90° C. to about 150° C. Comminuting methods such as a pin mill grinder can be optionally applied to the dried conditioned clay to yield clay having a desired particle size distribution.

The acidic filtrate can be optionally neutralized to a pH value of about 3 to about 5 with a neutralizing agent such as calcium carbonate ($CaCO_3$) in a tank with agitator or other liquid mixing system. A portion of the neutralized filtrate can be recycled for use in the clay slurrying step, if desired. An unrecycled, filtrate purge containing precipitated salts like gypsum is routed to waste processing. However, acidic filtrate may be fully recycled so long as solid salts are purged prior to the clay slurrying step.

Figure 3:
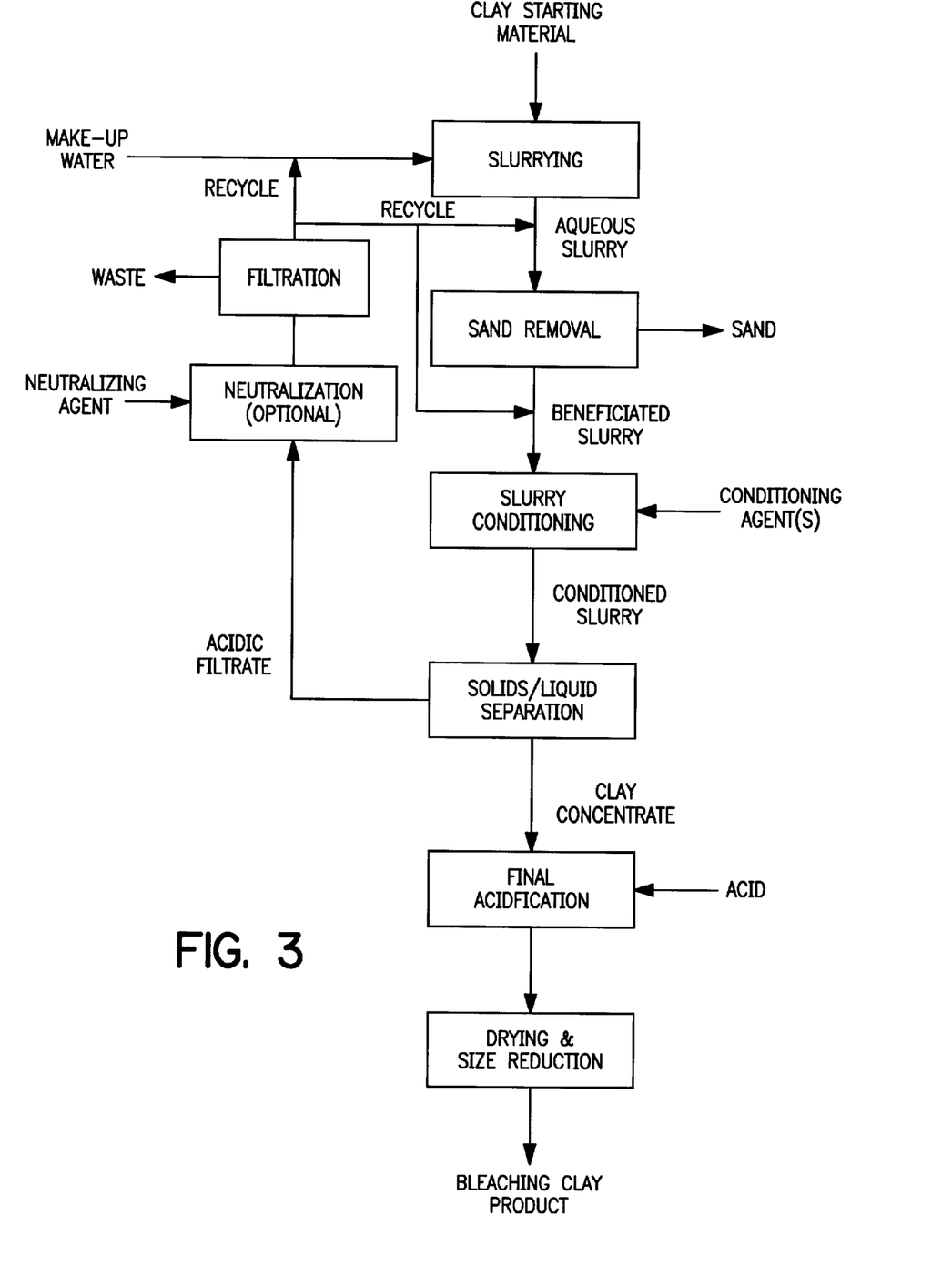
FIG. 3 is yet another simplified flow diagram of a process for making bleaching clay according to the present invention.

FIG. 3 illustrates an alternate embodiment of the present invention in which the conditioned clay concentrate undergoes a final acidification step before drying by the addition of an inorganic acid such as sulfuric acid, hydrochloric acid, and the like. The drying step can be implemented in a rotary dryer, a fluid bed dryer, a spray dryer, a flash dryer, and the like.

Oils that can be bleached using compositions prepared according to present methods include both edible and inedible oils. Illustrative oils are those previously mentioned hereinabove. Throughout this application, the term "oil," and the grammatical variations thereof, includes vegetable-derived, animal-derived as well as marine source-derived fats and fatty oils that are liquids at the particular temperature that is necessary for desired processing of a particular type of oil. Examples in the edible vegetable oil category include canola, coconut, corn germ, cottonseed, olive, palm, peanut, rapeseed, safflower, sesame seed, soybean, and sunflower oils. Exemplary nonedible vegetable oils include linseed oil and castor oil, and the perhaps lesser-known jojoba oil. Illustrative sources of edible animal-derived oil include lard and tallow. Examples of nonedible animal-derived oil are low grade tallow and neat's-foot oils.

A bleaching clay manufactured in accordance with the method of the present invention exhibits the following characteristics:

A cation exchange capacity of no more than about 0.6 milliequivalents per gram (meq/g), preferably about 0.2 to about 0.5 meq/g, as determined by methylene blue endpoint.

The electrical conductivity of no more than about 2,500 micro Siemens per centimeter ($\mu S/cm$), measured by dipping the probe into a 5 wt-% clay suspension.

A pH value of less than 7, preferably about 2 to about 5, measured by dipping the probe into a 5 wt-% clay suspension.

A $N_2$-BET surface area of no more than about 200 $m^2/g$; Brunauer et al., J. Am. Chem. Soc. 60:309(1938).

A $N_2$-BET mean pore size in the range of about 7 to about 12 nanometers (nm); Brunauer et al., J. Am. Chem. Soc. 60:309(1938).

An ethyl glycol monoethyl ether surface area of no more than 800 $m^2/g$, determined by the method of Carter et al., Soil Science 100:(5):356–360 (1965).

A CaO content of no more than about 1 weight percent.

An Eosin Red dye absorption value of no more than about 0.25 relative absorbance at 518 nm (±5 nm) for the supernatant generated by one gram of clay suspended into 20 milliliters of 0.1% dye solution and diluted 1:25 (vol/vol) with distilled water following settling.

A titrable surface acidity in the range of about 0.4 to about 0.6 meq/g, calculated as the difference between total titrable acidity of an aqueous clay suspension (1 wt-% clay), titrated with 0.01 N or 0.1 N aqueous NaOH solution at 25° C.±0.1° C. and a base addition rate of no more than about 0.6 ml/minute, and titrable acidity of a clay-free water extract from the aforesaid aqueous clay suspension titrated in the same manner as stated above.

A S2 surface acidity-to-total surface acidity ratio in the range of about 0.15 to about 0.45, calculated as $$S2/(S1+S2+S3+S4)$$

where

S1 represents titration endpoint of pH value in the range of about 3.5 to 4.0 for exchangeable hydrogen and the first hydrolysis step of Fe;

S2 represents titration endpoint at pH value in the range of about 5.3 to 6.3 for Al hydrolysis and partial contribution from the second hydrolysis step of Fe;

S3 represents titration endpoint at pH value in the range of about 7.0 to 8.3 for the third hydrolysis step of Fe; and S4 represents titration endpoint at pH value in the range of about 10.4 to 11.2 for the first hydrolysis step of Mg; all titrated as described hereinabove for determination of surface acidity.

The present invention is illustrated further by the following examples.

EXAMPLE 1

Measured Bleaching Effect on Eosin Red Dye Solution

A 0.1 weight percent red dye solution was prepared by dissolving sufficient Eosin Red biological stain (source: Fisher Scientific) in de-ionized water. Twenty-gram samples of the dye solution were treated with beneficiated palygorskite-smectite bleaching clay conditioned with 0.25 N sulfuric acid at two different clay loadings: 0.4 grams of bleaching clay/20 milliliters of dye solution and 1 gram of bleaching clay/20 milliliters of dye solution. The beneficial bleaching clay was added to the dye solution and swirled on a mechanical shaker for 15 minutes. Following mechanical shaking, the beneficiated bleaching clay was allowed to settle for one hour and then the settled mixture was centrifuged. One milliliter of the resulting liquid phase was extracted and diluted with 24 milliliters of distilled water to make a 1:25 dilution. The diluted sample was tested for light absorbance at a wavelength of 516 to 518 nanometers using a Beckman DU40 Spectrometer. Similar tests were performed with two commercially available bleaching clays. The results are presented in Table 2, below.

TABLE 2

| | Relative Absorbance (516–518 nm) |
|---|---|
| untreated dye solution | 2.55 |
| 0.4 g beneficiated bleaching clay/20 g solution | 1.25 |
| 1.0 g beneficiated bleaching clay/20 g solution | 0.08 |
| 0.4 g Pro-Active[1] | 2.42 |
| 1.0 g Pro-Active[1] | 1.95 |
| 0.4 g Filtrol F105[2] | 1.94 |
| 1.0 g Filtrol F105[2] | 0.188 |

[1]bleaching clay commercially available from Oil-Dri Corporation of America
[2]bleaching clay commercially available from Engelhard Corporation

EXAMPLE 2

Manufacture of Bleaching Clays

Clay minerals from various deposits were processed in accordance with the present invention to a solids content of about 40 to 50 weight percent and then dried. Bleaching results are presented in Table 3, below.

TABLE 3

Wet Beneficiation of Clays

| Sample | Acidification | Mineralogy | Chl. (ppb) | R/Y |
|---|---|---|---|---|
| Clay Deposit I | 0.25N $H_2SO_4$ | Ca/Mg Montmorillonite | 4,589 | 8.5/70 |
| Clay Deposit II | 0.25N $H_2SO_4$ | Ca/Mg Montmorillonite/Opal CT | 4,415 | 7.5/70 |
| Clay Deposit III | 0.25N $H_2SO_4$ | Ca/Mg Montmorillonite + trace Palygorskite | 4,408 | 7.9/70 |
| Clay Deposit IV | 0.25N $H_2SO_4$ | Palygorskite/Smectite mixed with minor DE | <50 | 2.2/50 |
| Clay Deposit V | 0.25N $H_2SO_4$ | Palygorskite + trace Smectite | 83 | 2.6/60 |
| Clay Deposit VI | 0.25N $H_2SO_4$ | Palygorskite/Smectite mixed | 296 | 6.3/70 |

Bleaching Conditions: Starting Oil contained 13,427 ppb chlorophyll; AOCS Red/Yellow Color: >20/70 using a 5.25" Cell. 200 Grams oil, 1.375 wt-% acid activated clay mineral (w/w oil) held at 230° F. for 30 minutes under 26" Hg vacuum.

EXAMPLE 3

Bleaching Results for Sunflower Oil

Sunflower oil having an initial Color Index of 4.65 was bleached with conventionally acidified palygorskite-smectite clay (Pro-Active; about 3 weight percent $H_2SO_4$) and a beneficiated palygorskite-smectite clay treated with aluminum sulfate (WB-C; about 1 weight percent aluminum sulfate, dry basis). The bleaching conditions were as follows: 200 grams of oil, 220° F., 30 minutes, under 26–28" Hg vacuum.

The bleaching results are presented in Table 4, below.

TABLE 4

Color Index[3] After Bleaching

| Bleaching Clay | Color Index Amount | | |
|---|---|---|---|
| | @ 0.75 wt-% | @ 1.0 wt-% | @ 1.25 wt-% |
| Pro-Active | 1.80 | 1.15 | 1.05 |
| WB-C | 1.04 | 0.80 | 0.65 |

[3]Color Index = $\frac{[\text{Reds} + \text{Yellows}/10]}{2}$ where Reds and Yellows are AOCS Red/Yellow Lovibond values.

EXAMPLE 4

Bleaching Results for Soya Oil

Soya oil (200-gram aliquots) having a chlorophyll content of about 320 parts per billion (ppb) was treated for 30 minutes at 248° F. under 26–28 inches of vacuum with conventionally acidified palygorskite-smectite clay (Pro-Active; about 3 weight percent $H_2SO_4$) and a beneficiated palygorskite-smectite clay treated with 0.25 N $H_2SO_4$ (WB-A). The bleaching results are presented in Table 5, below.

TABLE 5

Chlorophyll Content After Bleaching

| Bleaching Clay | Remaining Chlorophyll (ppb) Amount | | | |
|---|---|---|---|---|
| | @ 0.05 wt-% | @ 0.1 wt-% | @ 0.25 wt-% | @ 0.5 wt-% |
| Pro-Active | 274 | 161 | 57 | 29 |
| WB-A | 147 | 69 | 29 | 10 |

EXAMPLE 5
Bleaching Results for Deodorized Canola Oil

Canola oil (200-gram aliquots) having a chlorophyll content of about 13,398 parts per billion (ppb), Red/Yellow color values of about 20/70, was treated for 30 minutes at 230° F. under 26–28 inches of vacuum with conventionally acidified palygorskite-smectite clay (Pro-Active, about 3 weight percent $H_2SO_4$) and a beneficiated palygorskite-smectite clay treated with 0.25 N $H_2SO_4$ (WB-A). Thereafter the canola oil was deodorized by treating a 60-gram aliquot of bleached oil with 3–10 wt-% steam for 60 minutes at 500° F. (260° C.) and vacuum (<1 mm Hg). The results are presented in Table 6, below.

TABLE 6

Chlorophyll and Color After Deodorization

| | Remaining Chlorophyll (ppb) and Color (R/Y) Amount | | | | | | | | | | | | | | | | | | | | | | |
|---|---|---|---|---|---|---|---|---|---|---|---|---|---|---|---|---|---|---|---|---|---|---|---|
| Bleaching | @ 0.25 wt-% | | | @ 0.5 wt-% | | | @ 0.75 wt-% | | | @ 1.0 wt-% | | | @ 1.25 wt-% | | | @ 1.5 wt-% | | | @ 1.75 wt-% | | | @ 2.0 wt-% | | |
| Clay | ppb | R | Y | ppb | R | Y | ppb | R | Y | ppb | R | Y | ppb | R | Y | ppb | R | Y | ppb | R | Y | ppb | R | Y |
| Pro-Active | 7,602 | — | — | 3,659 | — | — | 1,380 | — | — | 598 | 2.2 | 20 | 236 | 1.4 | 16 | 195 | 1.2 | 10 | 88 | 1.2 | 9.2 | 49 | 0.9 | 6.7 |
| WB-A | 3,815 | — | — | 1,019 | — | — | 344 | — | — | 89 | 1.0 | 6 | 39 | 0.6 | 5 | 23 | 0.6 | 4.8 | 16 | 0.4 | 4 | 9 | 0.5 | 4 |

"—" = no data; oil not suitable for deodorization

EXAMPLE 6
Bleaching Results for Olive Kernel Oil

Olive kernel oil (200-gram aliquots) having a chlorophyll content of about 19,263 parts per billion (ppb) was bleached with conventionally acidified palygorskite-smectite clay (Oil-Dri Pro-Active; about 3 weight percent $H_2SO_4$) and a beneficiated palygorskite-smectite clay treated with 0.25 N $H_2SO_4$ (WB-A). The bleaching conditions were as follows: 200 grams of oil, 230° F., 30 minutes, 26–28" Hg vacuum.

The bleaching results are presented in Table 7, below.

TABLE 7

Chlorophyll Content After Bleaching

| Bleaching Clay | Remaining Chlorophyll (ppb) Amount | | |
|---|---|---|---|
| | @ 2 wt-% | @ 4 wt-% | @ 6 wt-% |
| Pro-Active | 6,600 | 1,992 | 1,328 |
| WB-A | 2,349 | 821 | 404 |

EXAMPLE 7
Bleaching Results for Cottonseed Oil

Cottonseed oil (200-gram aliquots) having an initial Color Index of 5.7 was bleached with a palygorskite-smectite clay (Oil-Dri B-80; no acidification) and a beneficiated palygorskite-smectite clay treated with aluminum sulfate (WB-C; about 1 weight percent aluminum sulfate, dry basis). The bleaching conditions were as follows: 100 grams oil, 194° F., 20 minutes, 26–28" Hg vacuum.

The bleaching results are presented in Table 8, below.

TABLE 8

Color Index After Bleaching

| Bleaching Clay | Color Index Amount | | | |
|---|---|---|---|---|
| | @ 0 wt-% | @ 0.5 wt-% | @ 1 wt-% | @ 1.5 wt-% |
| B-80 | 5.7 | 3.1 | 2.7 | 2.0 |
| WB-C | 5.7 | 2.7 | 2.0 | 1.7 |

EXAMPLE 8
Bleaching Results from Deodorized Corn Oil

Corn oil (200-gram aliquots) having an initial Color Index value of about 7.3 was bleached with palygorskite-smectite clay (Oil-Dri B-80; no acidification), conventionally acidified palygorskite-smectite clay (Oil-Dri Pro-Active; about 3 weight percent $H_2SO_4$), and a beneficiated palygorskite-smectite clay treated with aluminum sulfate (WB-C; about 1 weight percent aluminum sulfate, dry basis). The bleaching conditions were as follows: 200 grams oil, 220° F., 30 minutes, 26–28" Hg vacuum.

The bleached corn oil was then deodorized by treating a 60-gram aliquot of bleached oil with 3–10 wt-% steam for 60 minutes at 500° F. (260° C.) and vacuum (<1 mm Hg). The Color Index values of the finished oils are presented in Table 9, below.

TABLE 9

Color Index After Bleaching and Deodorization

| Bleaching Clay | Color Index Amount | | | |
|---|---|---|---|---|
| | @ 0.5 wt-% | @ 1 wt-% | @ 1.5 wt-% | @ 2 wt-% |
| B-80 | 1.33 | 1.00 | 0.94 | 0.77 |
| Pro-Active | 1.50 | 1.14 | 1.02 | 0.74 |
| WB-C | 1.09 | 0.82 | 0.75 | 0.75 |

EXAMPLE 9
Bleaching Results for Palm Oil

Malaysian palm oil (200-gram aliquots) having an initial Red color value of 12.4 was bleached with palygorskite-smectite clay (Oil-Dri B-80; no acidification), conventionally acidified palygorskite-smectite clay (Oil-Dri B-81; about 1 weight percent $H_2SO_4$), and a beneficiated palygorskite-smectite clay treated with 0.1 N $H_2SO_4$ (WB-B). The bleaching conditions were as follows: 200 grams of oil were pre-dried by heating to 194° F. under 26–28" Hg vacuum for 15 minutes, then pre-treated with 750 ppm of a 20 wt-% $H_3PO_4$ solution for 20 minutes with stirring under atmospheric conditions at 194° F., followed by bleaching with clay added at 194° F., vacuum applied at 26–78" Hg, and thereafter heated to 230° F. and held for 30 minutes at that temperature.

The bleaching results are presented in Table 10, below.

TABLE 10

Red Color Value After Deodorization

| Bleaching | Red Color Value (AOCS 5¼" cell) Amount | | |
|---|---|---|---|
| Clay | @ 1.5 wt-% | @ 2 wt-% | @ 2.5 wt-% |
| B-80 | 6.3 | 3 | 3.2 |
| B-81 | 6.6 | 3.3 | 3.2 |
| WB-B | 4.8 | 2.3 | 1.5 |

In all bleaching examples clay was separated from the oil after bleaching using a Baroid cup fitted with a pressurized nitrogen source and lined with filter paper (Whatman 541).

The foregoing specification and the examples are illustrative, and are not to be taken as limiting. Still other embodiments within the spirit and scope of the present invention are possible and will readily present themselves to those skilled in the art.

We claim:

1. A method for the manufacture of a bleaching clay which comprises:
   slurrying particulate palygorskite clay starting material with water to form an aqueous slurry having a clay solids content in the range of about 5 to about 30 weight percent, based on the total weight of the slurry;
   removing sand from the aqueous slurry to form a beneficiated slurry;
   conditioning the beneficiated slurry by admixing therewith a conditioning agent selected from the group consisting of a pH modifier, a Lewis acid salt, and mixtures thereof, in an amount in the range of about 0.25 to about 3 weight percent, based on the dry weight of the clay in slurry, so as to adjust the pH of the slurry to a value in the range of about 0.5 to about 6;
   separating the conditioned slurry into an acidic filtrate and a conditioned clay concentrate having a clay solids content of 15 up to 50 percent by weight, based on the total weight of the concentrate; and
   drying the conditioned clay to a free flowing particulate mass.

2. The method of claim 1 wherein the clay starting material is formed by reducing the size of raw clay to less than one-half inch (about 13 mm).

3. The method of claim 1 wherein the beneficiated slurry has a mean clay particle-size in the range of about 25 to about 45 microns.

4. The method of claim 1 wherein the clay starting material is a naturally occurring palygorskite-smectite clay mineral.

5. The method of claim 1 wherein sand is separated from the aqueous slurry prior to conditioning.

6. The method of claim 1 wherein the sand is separated from the aqueous slurry with a hydrocyclone.

7. The method of claim 1 wherein the Lewis acid salt is selected from the group consisting of zinc sulfate, aluminum sulfate, ferrous sulfate, and titanium sulfate, and mixtures thereof.

8. The method of claim 1 wherein the Lewis acid salt is added before the pH modifier.

9. The method of claim 1 wherein the pH modifier is selected from the group consisting of sulfuric acid, hydrochloric acid, phosphoric acid, formic acid, acetic acid, oxalic acid, citric acid, and mixtures thereof.

10. The method of claim 1 wherein the clay starting material is selected to have a pH value in the range of about 5 to about 9 and wherein inorganic acid is combined with the beneficiated slurry to achieve an acid concentration in the range of about 0.01 to about 1 Normal.

11. The method of claim 1 wherein the clay starting material is selected to have a pH value in the range of about 7 to about 9 and wherein inorganic acid is admixed with the beneficiated slurry to achieve an acid concentration in the range of about 0.01 to about 0.4 Normal.

12. The method of claim 1 wherein a portion or all of the acidic filtrate fluid as received is recycled for use.

13. The method of claim 1 wherein a portion or all of the acidic filtrate is neutralized and then recycled for use in slurrying the clay starting material.

14. The method of claim wherein the conditioned clay concentrate has a gel or paste consistency.

15. The method of claim 1 wherein the conditioned clay concentrate has a hard cake consistency.

16. The method of claim 1 wherein the dried clay is comminuted to a desired particle size distribution.

17. The method of claim 1 wherein the total solids content of the beneficiated slurry during conditioning is in the range of about 5 to 15 percent, based on the total weight of the slurry.

18. The method of claim 1 wherein the conditioned slurry is concentrated to a clay solids content of about 40 to about 50 percent by weight.

19. A method for the manufacture of an enhanced-performance bleaching clay which comprises:
   slurrying particulate palygorskite clay starting material with water to form an aqueous slurry having a total solids content in the range of about 5 to about 30 percent by weight;
   removing sand from the aqueous slurry to form a beneficiated slurry;
   conditioning the beneficiated slurry by adjusting the pH of the slurry to a pH value in the range of about 1 to about 3, wherein the pH is adjusted by addition of a member of the group consisting of an inorganic acid, a Lewis acid salt, and a mixture thereof;
   separating the conditioned slurry into an acidic filtrate and a concentrate of conditioned clay having a clay solids content of at least about 15 percent by weight; and
   drying the conditioned clay by heating the conditioned slurry to a temperature in the range of about 90° C. to about 150° C.

20. The method of claim 19 wherein the conditioning step includes agitating the slurry at a temperature in the range of about ambient to about 80° C. after the pH has been adjusted.

21. The method of claim 19 wherein the slurry has an average agitation time no less than about 15 minutes up to about 1 hour during the conditioning step.

22. The method of claim 19 wherein the conditioned clay is separated from the conditioned slurry to form a clay mass having a solids content in the range of about 15 to about 50 percent by weight.

23. The method of claim 22 wherein the clay concentrate is washed with water at the solid/liquid separation stage and thereafter the washed clay concentrate is further dewatered to a solids content in the range of about 40 to about 50 percent by weight, prior to drying.

24. The method of claim 19 wherein the clay concentrate is dried and comminuted to a particle size distribution such that at least 95 percent of the particles, dry weight basis, have a particle size in the range of 5 to 400 microns, with less than 2 percent of the clay particles, dry weight basis, greater than 400 microns and less than 3 percent of the clay particles, dry weight basis, less than 5 microns.

25. The method of claim 19 wherein the slurrying step is accomplished by blunging the clay starting material with water.

26. The method of claim 19 wherein the slurrying step includes mixing the clay starting material with water and a clay dispersant.

27. The method of claim 19 further comprising a final acidification step, after the solid/liquid separation step and before the drying step, wherein the pH of the cake of conditioned clay is adjusted by acid addition to a value in the range of about 2.5 to about 3.5.

28. The method of claim 19 which is carried out as a continuous process.

29. The method of claim 19 which is carried out as a batch process.

30. A method for the manufacture of a bleaching clay which comprises:

blunging a particulate clay starting material in the presence of a dispersant and water to a clay solids content in the range of about 10 to about 30 weight percent, based on the total weight of the slurry;

fractionating the aqueous slurry in a hydrocyclone to remove sand;

combining the fractionated clay with aluminum sulfate and sulfuric acid in the presence of heat and agitation to form a conditioned slurry, the aluminum sulfate being added in an amount in the range of about 0.25 to about 3 weight percent, based on the dry weight of the clay in slurry, the sulfuric acid being added in an amount sufficient to achieve a slurry acid concentration in the range of about 0.01 to about 1 Normal;

concentrating the conditioned slurry by filtration to a clay solids content of at least about 15 percent by weight; and drying the concentrated clay to moisture content in the range of about by 5 to about 25 percent by weight, based on the dry weight of the conditioned clay.

31. The method of claim 30 wherein the slurry acid concentration is about 0.1 to about 0.4 Normal.

* * * * *

UNITED STATES PATENT AND TRADEMARK OFFICE
CERTIFICATE OF CORRECTION

PATENT NO.    : 6,365,536 B1
DATED         : April 2, 2002
INVENTOR(S)   : Steven T. Council et al.

It is certified that error appears in the above-identified patent and that said Letters Patent is hereby corrected as shown below:

Column 6,
Table 1, third column, line 14, "$S^{5+}$" should be -- $S^{6+}$ --.

Column 14,
Line 31, after "claim" insert -- 1 --.

Column 15,
Lines 28-32, delete claim 27.

Signed and Sealed this

Tenth Day of December, 2002

JAMES E. ROGAN
*Director of the United States Patent and Trademark Office*